United States Patent
Feldis, III

(10) Patent No.: US 7,110,026 B2
(45) Date of Patent: Sep. 19, 2006

(54) IMAGE TAGGING FOR POST PROCESSING

(75) Inventor: John J. Feldis, III, Menlo Park, CA (US)

(73) Assignee: Logitech Europe S.A., Romanel-sur Morges (CH)

( * ) Notice: Subject to any disclaimer, the term of this patent is extended or adjusted under 35 U.S.C. 154(b) by 839 days.

(21) Appl. No.: 09/898,476

(22) Filed: Jul. 3, 2001

(65) Prior Publication Data

US 2003/0007078 A1   Jan. 9, 2003

(51) Int. Cl.
*H04N 5/225* (2006.01)
*H04N 5/76* (2006.01)

(52) U.S. Cl. .............................. 348/231.6; 348/207.1

(58) Field of Classification Search ............ 348/207.1, 348/207.2, 211.1, 211.3, 231.99, 231.2, 231.3, 348/231.5, 231.6, 231.9; 709/200, 201
See application file for complete search history.

(56) References Cited

U.S. PATENT DOCUMENTS

| | | | |
|---|---|---|---|
| 5,477,264 A | 12/1995 | Sarbadhikari et al. | |
| 5,696,850 A | 12/1997 | Parulski et al. | |
| 5,943,093 A * | 8/1999 | Anderson et al. | 348/231.6 |
| 5,978,519 A | 11/1999 | Bollman et al. | |
| 6,016,354 A | 1/2000 | Lin et al. | |
| 6,020,920 A | 2/2000 | Anderson | |
| 6,041,143 A | 3/2000 | Chui et al. | |
| 6,058,248 A | 5/2000 | Atkins et al. | |
| 6,075,542 A | 6/2000 | Fredlund et al. | |
| 6,128,038 A | 10/2000 | Nakajima | |
| 6,134,339 A | 10/2000 | Luo | |
| 6,167,469 A | 12/2000 | Safai et al. | |
| 6,177,956 B1 | 1/2001 | Anderson et al. | |
| 6,185,000 B1 | 2/2001 | Shiota et al. | |
| 6,198,526 B1 | 3/2001 | Ohtsuka | |
| 6,535,243 B1 * | 3/2003 | Tullis | 348/207.1 |
| 6,573,927 B1 * | 6/2003 | Parulski et al. | 348/32 |
| 6,636,259 B1 * | 10/2003 | Anderson et al. | 348/211.3 |
| 6,714,204 B1 * | 3/2004 | Ishida et al. | 345/522 |
| 6,762,791 B1 * | 7/2004 | Schuetzle | 348/231.3 |
| 6,812,962 B1 * | 11/2004 | Fredlund et al. | 348/231.2 |

(Continued)

FOREIGN PATENT DOCUMENTS

EP   838939 A2 *   4/1998

(Continued)

OTHER PUBLICATIONS

EXIF Reader, Image Data File Analysis, printed on Mar. 26, 2001, www.takenet.or.jp/~ryuuji/minisoft/exifrread/english/.

(Continued)

*Primary Examiner*—Tuan Ho
*Assistant Examiner*—Timothy J. Henn
(74) *Attorney, Agent, or Firm*—Townsend and Townsend and Crew, LLP

(57) ABSTRACT

A method of processing image data includes providing an image capturing apparatus. A host device for receiving image data generated by the image capturing apparatus is provided. An image to be captured with the image capturing apparatus is targeted. First image data representing the targeted image is generated using the image capturing apparatus. The first image data has a first resolution size. A first tag to the first image data is attached for post processing in the host device. The first tag instructs the host device to convert the first image data from the first resolution size to a second resolution size. The apparatus is programmed to automatically attach the first tag to the first image data once the first image data is generated.

8 Claims, 4 Drawing Sheets

U.S. PATENT DOCUMENTS

2002/0136450 A1* 9/2002 Chen et al. .......... 382/165

FOREIGN PATENT DOCUMENTS

WO     WO 00/74370 A1    12/2000

OTHER PUBLICATIONS

Summary of DPOF Version 1.10, Canon, Inc., Eastman Kodak Company, Jul. 17, 2000, www.panasonic.co./jp/avc/video/dpof/dpof_110/white_e.htm, printed Mar. 26, 2001.

FRCN Digital Imaging, Reading EXIF Image Data, Updated Aug. 23, 2000, www.quiknet.com/~frcn/EXIF.html, printed Mar. 26, 2001.

International Organization for Standardization Technical Committee 42—Photography, ISTO/TC42N 4378, 1998, NY.

Tiff-Standard, Revision 6.0 Final, Jun. 3, 1992 Adobe Developers Association, Adobe Systems Incorporated; http://partners.adobe.com/public/developer/en/tiff/TIFF6.pdf. pp. 1-121.

* cited by examiner

IMAGE TAGGING FOR POST PROCESSING

BACKGROUND OF THE INVENTION

The present invention relates to digital camera technology. More specifically, the present invention relates to a method and apparatus for image tagging for post processing in a host device.

Digital cameras have been gaining wide acceptance among consumers recently. Many digital cameras are equipped with fast processors to enable users to perform heavy data processing functions, e.g., stitching a plurality of pictures, on the cameras. This reduces the inconvenience of subsequently editing or otherwise processing the image data on a host device, e.g., computer, by users. However, providing cameras with the state-of-art processors increases the cost of digital cameras to the consumers.

One type of digital camera is disclosed in U.S. Pat. No. 6,198,526, assigned to Fuji Photo Film Co., Ltd. The digital camera allows a user to view the pictures taken on the camera and attach printing instructions to the corresponding image data.

Another type of digital camera is disclosed in U.S. Pat. No. 5,477,264, assigned to Eastman Kodak Company. The digital camera includes a programmable processor and a removable storage device with a preloaded enhancement files. These files may be used to modify captured image data in selected ways, update the operating code of the camera, or for communicating non-captured image-like data.

Yet another type of digital camera is disclosed in U.S. Pat. No. 6,185,000, assigned to Fuji Photo Film Co., Ltd. This patent shows that recording information, e.g., the date of photographing, is attached the image data. The recording information may or may not be printed on the picture prints according to user input subsequently made on a computer.

In addition, U.S. Pat. No. 6,167,469, assigned to Agilent Technologies, Inc., discloses a digital camera that enables digital images to be transmitted to a selected destination. A voice message may be attached to the digital images and sent to the selected destination.

One recently adopted digital camera standard, DPOF Version 1.0, available on "http:www.panasonic.co.jp/avc/video/dpof/dpof_110/white_e.htm," discloses some functions that may be performed in certain digital cameras. DPOF Version 1.0 allows the following functions to be specified on the camera: (1) multi-image print, (2) specifying the size of printed images, (3) auto-transfer via Internet and fax, and (4) auto play for slide show. The multi-image-print feature enables one to specify the number of images to be printed on one sheet. The specifying-the-size-of-printed-images feature enables one to specify the size of the printed images, so that one could use the prints for a variety of applications, such as displays and certificate materials. The auto-transfer-via-Internet-and-fax feature enables one to attach a message to image data and send the resulting data via email. The auto-play-for-slide-show feature enables one to specify the images to be played back on liquid crystal displays of digital cameras, video projectors, or PCs for slide show.

Another digital camera standard, Exif Reader, available on "http://www.takenet.or.jp/~ryuui/minisoft/exifread/english/," provides a numerous TIFF/EP tags that may be attached to the image data generated by digital cameras.

None of the above prior art, however, appear to address the need to provide users with a digital camera that provides editing features without the use of the state-of-art processor.

BRIEF SUMMARY OF THE INVENTION

The present invention provides a method, and corresponding apparatus, for attaching a tag to image data generated by an image capturing device for post processing in a host device. In one embodiment, a method of processing image data includes providing an image capturing apparatus. A host device for receiving image data generated by the image capturing apparatus is provided. An image to be captured with the image capturing apparatus is targeted. First image data representing the targeted image is generated using the image capturing apparatus. The first image data has a first resolution size. A first tag to the first image data is attached for post processing in the host device. The first tag instructs the host device to convert the first image data from the first resolution size to a second resolution size. The apparatus is programmed to automatically attach the first tag to the first image data once the first image data is generated.

The method above allocates the resolution enhancement function, which is process intensive, to a computers. Other functions, such as red-eye removal, may be automatically allocated to the computer by tagging image data with appropriate instructions. The method above also may allow more image data to be stored in a given flash card.

For a further understanding of the nature and advantages of the invention, reference should be made to the following description taken in conjunction with the accompanying drawings.

DESCRIPTION OF THE SPECIFIC EMBODIMENTS

Figure 1B:
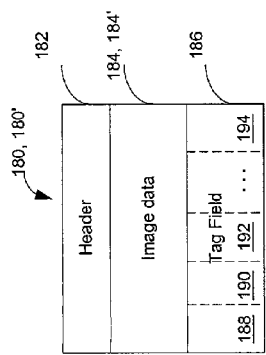
FIG. 1B. depicts a block diagram of an image data file according to one embodiment of the invention.
Figure 1A:
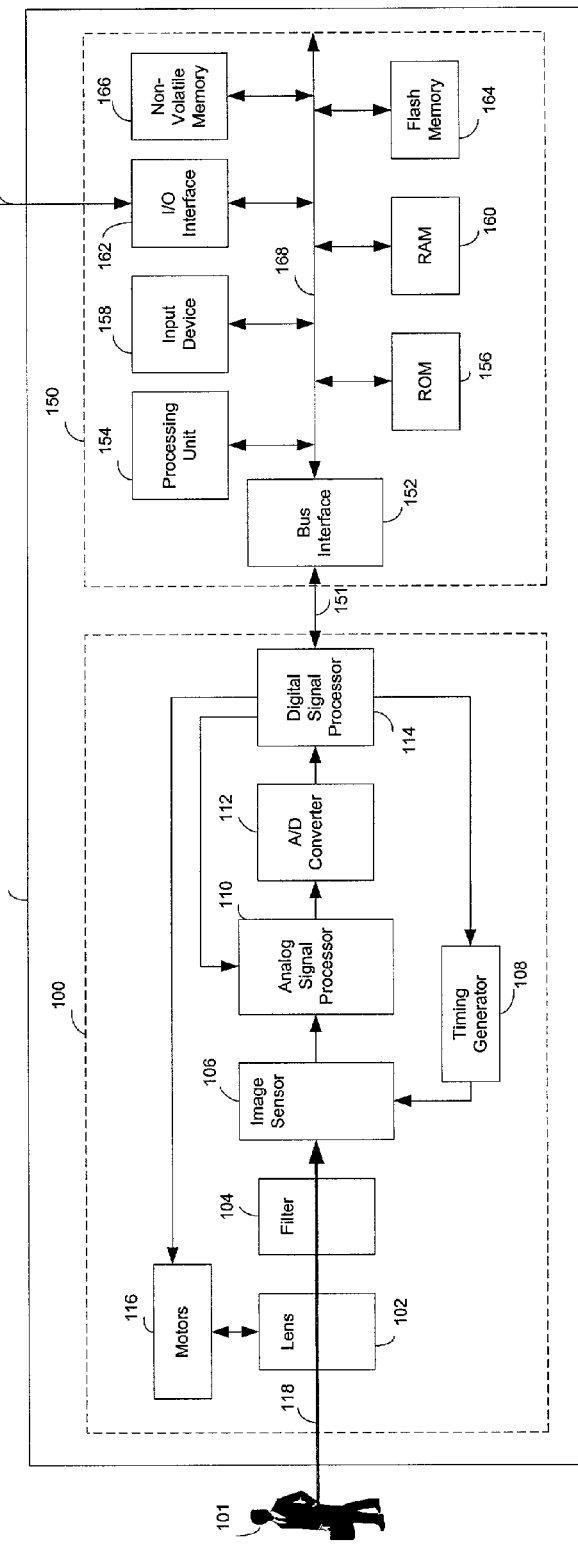
FIG. 1A is a block diagram of a digital camera according to one embodiment of the invention.

Referring to FIG. 1A, a digital camera 50 includes an imaging device 100 and a processing system 150. The imaging device includes a lens 102 having an iris, a filter 104, an image sensor 106, a timing generator 108, an analog signal processor (ASP) 110, an analog-to-digital (A/D) converter 112, a digital signal processor (DSP) 114, and one or more motors 116.

In operation, imaging device 100 captures an image of object 101 via reflected light impacting image sensor 106 along an optical path 118. Image sensor 106 generates a set of raw image data representing the captured image. The raw image data is then routed through ASP 110, A/D converter 112 and DSP 114. DSP 114 has outputs coupled to timing generator 108, ASP 110, and motors 116 to control these components. DSP 114 also has its output coupled to processing system 150 via a bus 151. The raw image data are transmitted to system 150 and processed therein.

In one embodiment, processing system 150 includes a bus interface 152, a processor 154, a read-only memory (ROM) 156, an input device 158, a random access memory (RAM) 160, an I/O interface 162, a flash memory 164, a non-volatile memory 166, and an internal bus 168.

Bus interface 152 is a bi-directional first-in, first-out interface for receiving the raw image data and control signals passed between system 150 and DSP 114. Processor 154 executes programming instructions stored in ROM 156 and RAM 160 to perform various operations. ROM 156 generally stores a set of computer readable program instructions which control how processor 154 accesses, transforms and outputs the image data. In one implementation, ROM 156 also stores a start-up program or file that enable a user to access the images stored in the flash memory using any computer whether it has a companion driver software installed or not.

Input device 158 generally includes one or more control buttons (not shown) which are used to input operating signals that are translated by processor 154 into an image capture request, an operating mode selection request, and various control signals for imaging device 100. I/O Interface 162 is coupled to internal bus 168 and has an external port connector (not shown) that can be used to couple digital camera 50 to a computer 200 for viewing and editing the image data stored in flash memory 164. The camera and computer may be coupled to each other via a communication link 163. In one implementation, I/O interface 62 is a universal serial bus (USB) port.

Flash memory 164 stores the image data processed by the processor as image data files (see FIG. 1B). In one implementation, flash memory 164 is a removable flash card or disk, e.g., SmartMedia™ and CompactFlash™, so that a user may replace a full flash card with a new flash card to store additional image data. In other implementations, other types of non-volatile memory other than flash cards may be used.

Figure 5:
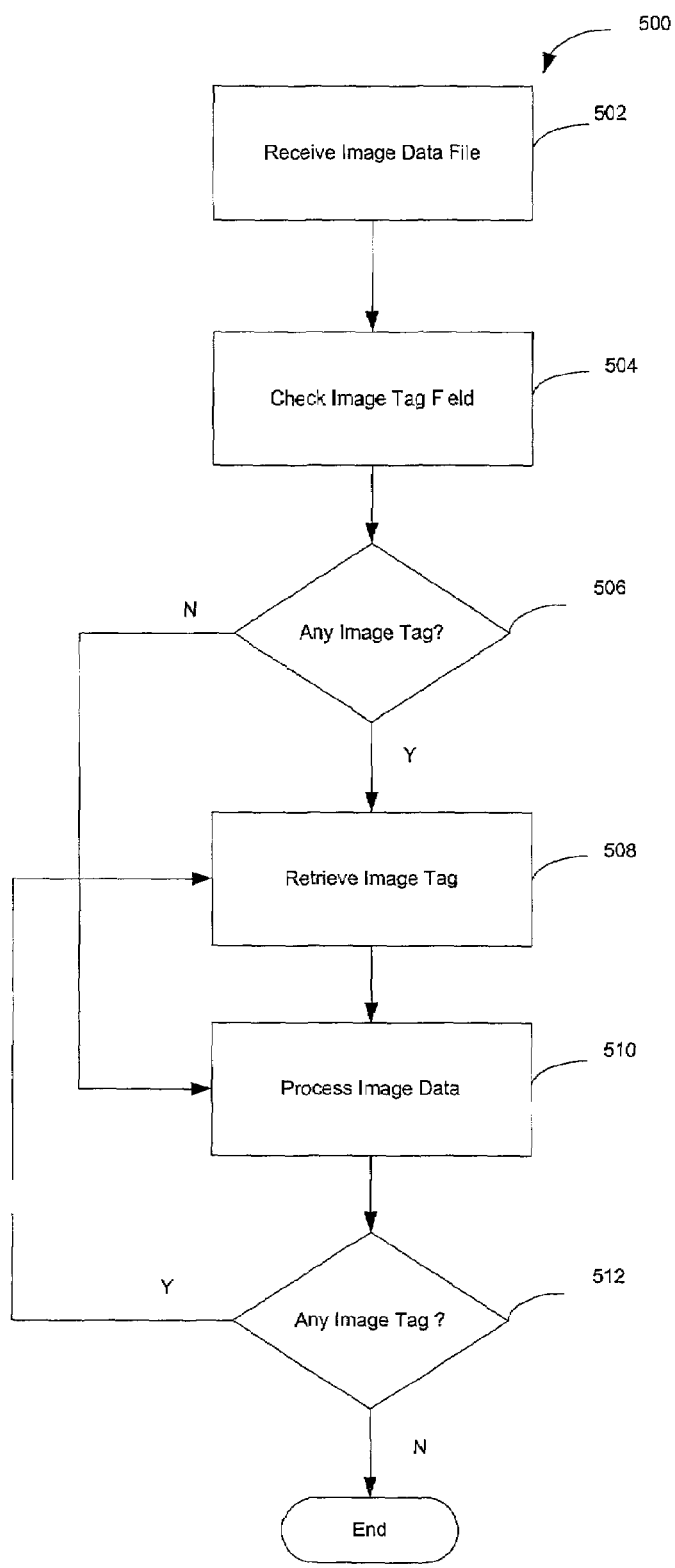
FIG. 5 depicts a simplified flow chart of processing image data according to the method of FIG. 3.

FIG. 1B illustrates a schematic block diagram of an image data file 180 including a header 182, a compressed image data 184, and a tag field 186. Header 182 includes information identifying corresponding image data file 180. Image data 184 represents an image captured with camera 50. The image data is generally in a compressed form, e.g., in JPEG format, to conserve memory space of flash card 164. Tag field 186 includes tags, e.g., a resolution tag 188, a cropping tag 190, a red-eye removal tag 192, and a quick-send tag 194, that provides instructions to computer 200 for post processing, as explained in more detail later in connection with FIGS. 3–5.

Referring back to FIG. 1A, non-volatile memory 166 stores an image counter whose current value becomes an identifier for each new set of image data captured by camera 50. The counter is preferably incremented each time a new image is captured.

Figure 2:
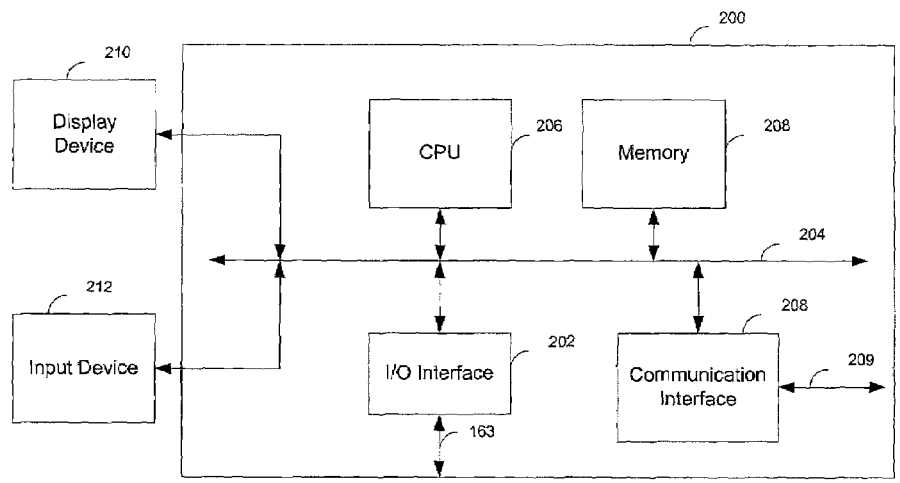
FIG. 2 depicts a block diagram of a computer system according to one embodiment of the invention.

Referring to FIG. 2, computer 200 includes an I/O interface 202 which can be used to couple computer 200 to camera 50. The computer also includes a bus 204 for communicating data, a central process unit (CPU) 206 coupled to bus 204 to process data, a memory 206 coupled to bus 204 to store data and instructions to be executed by CPU 206, and a communication interface 208 coupled to a network via a communication link 209. The communication interface may be an integrated services digital network (ISDN) card, modem, local area network (LAN) card, or the like. Computer 200 is coupled to a display device 210, e.g., a monitor, via bus 204 to display information and an input device 212, e.g., a keyboard, to input data to the computer. In operation, computer 200 serves as a host device for viewing, editing, and otherwise processing image data files received from camera 50 via I/O interface 202, as explained in more detail later in connection with FIG. 5. Alternatively, another electronic device, e.g., a cellular phone or portable digital assistant, may be used as the host device in place of the computer. Yet in other implementations, the image data files can be transmitted to the host device via an intermediary electronic device, such as a flash card reader (not shown).

Figures 3, 4:
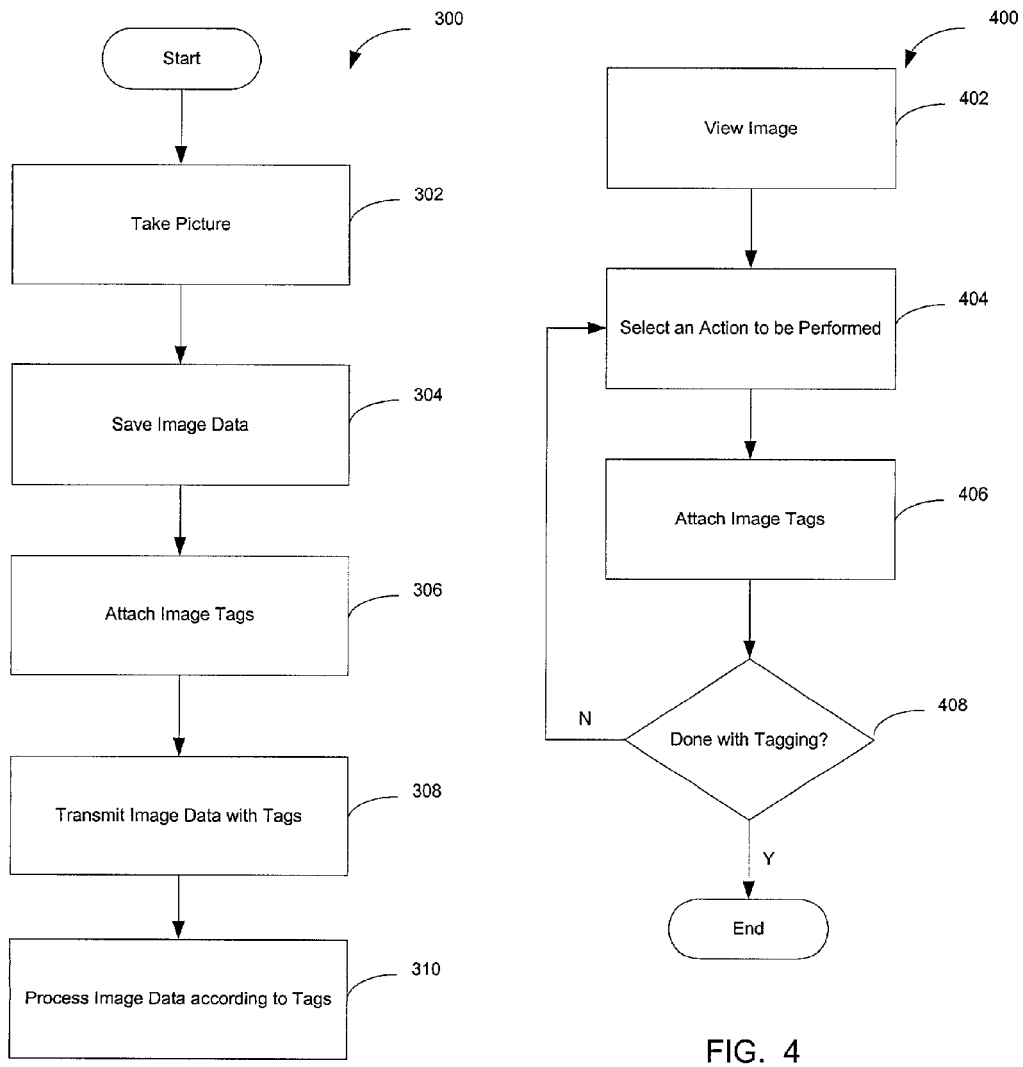
FIG. 3 depicts a simplified flow chart of a method of image tagging for post processing according to one embodiment of the invention.
FIG. 4 depicts a simplified flow chart of attaching an image tag according to the method of FIG. 3.

Referring to FIG. 3, a process 300 depicts a method of image tagging for post processing according to one embodiment of the present invention. At step 302, a user takes a picture using camera 50, from which raw image data is generated by image sensor 106. Processing unit 154 processes the raw image data, where the processing includes compressing the data to a more manageable size (step 304). In one implementation, the image data is compressed into a Joint Photographic Expert Group (JPEG) format. The user views the image corresponding to the saved image data and selects one or more tags to be attached to the image data (step 306). Thereafter, using the tags, computer 200 can process the image data files automatically, without specific user initiatives, upon receiving them from camera 50 according to the instructions specified in the tag. As a result, camera 50 does not require a powerful processor since heavy data processing functions may be allocated to be performed in computer 200. At the same time, the inconvenience to the user of editing or otherwise processing the image data on computer 200 is reduced.

Once the user decides on the tags to be attached, they are attached to the image data and stored in flash memory or flash card 164. That is, one or more tags are stored in tag field 186 of the image data file. The image data file is transmitted to computer 200 either by linking camera 50 to the computer, or removing the flash card and inserting it into a flash card reader that is coupled to the computer (step 308). Computer 200 processes the image data file according to the tags in the tag field (step 310). For example, if image data has a tag instructing the computer to increase the pixel resolution of the image data from one megapixels to three megapixels, the computer performs an appropriate algorithm to increase the resolution size of the image.

Referring back to step 306, a method 400 (FIG. 4) depicts a method of attaching tags to the image data according to one implementation of the present invention. At step 402, the user views the image data stored in RAM 160 or flash card 164. Generally, digital cameras, such as camera 50, includes a liquid crystal display (not shown) for viewing images. While viewing images on the liquid crystal display, the user may select an action to be performed subsequently by a host device (step 404). A tag with appropriate instructions is attached to the image data (step 406). The user is prompted if he or she is finished with the tagging (step 408). If so, method 320 ends and process 400 continues onto step 308. If not, steps 404 to 408 are repeated.

In one implementation, camera 50 enables the user to attach one or more of the following tags to the image data: (1) resolution tag 188, (2) cropping tag 190, (3) red-eye removal tag 192, and (4) quick-send tag 194 (see, FIG. 1B). The resolution tag instructs a host device, e.g., computer 200, to automatically convert the image data from one resolution size to another resolution size. For example, camera 50 is configured to save images in resolution size of one megapixels. The user may view the captured image, and if he or she likes the picture and wishes to enlarge it, the user may select to have the image data converted to a greater resolution, e.g., three megapixels. A method of converting an image from one resolution size to another resolution size is described in U.S. Pat. No. 6,058,248, which is incorporated by reference herein for all purposes.

In one implementation, the user may select from a plurality of resolution sizes or manually input the desired resolution size. In another implementation, the user may elect to have the image converted to a lower resolution size, particularly when the user wishes to email the image data to another person, to minimize use of the communication bandwidth. Yet in another implementation, the camera may be programmed to attach automatically attach a resolution tag without specific user initiative. For example, the user may set the default resolution size as two megapixels and require the camera to automatically attach a resolution tag to image data generated, where the resolution tag instructs a host device to convert the image data from two megapixels to one megapixels.

The cropping tag instructs computer 200 to automatically remove undesired portions of a picture. The user may view the captured image and decides which portion of the image to retain and which to delete. A method of cropping an image data is described in U.S. Pat. No. 5,978,519, which is incorporated by reference herein for all purposes.

The red-eye removal tag instructs computer 200 to automatically edit the image to remove the red-eye effects on pictures taken in poorly lighted environments. Pictures taken in poorly lighted environments may cause the pupils of people or animals to take on red tint. The user may review the picture taken and, if necessary, attach a tag instructing the computer to automatically remove the red-eye effects on the picture. In one implementation, the camera may be provided with a light sensor (not shown) and programmed to attach a red-eye removal tag automatically whenever a picture is taken in a poorly lighted environment. For example, the red-eye removal tags may be automatically attached to the images captured whenever a flash light (not shown) of the camera goes off. A method of removing the red-eye effects is described in U.S. Pat. No. 6,134,339, which is incorporated by reference herein for all purposes.

The quick-send tag instructs computer 200 to automatically send the image data to another person or entity via a communication network. Camera 50 may include a plurality of communication addresses, e.g., email addresses, in ROM 156. For each picture taken, the user may select one or more recipients to whom the picture should be sent. When the image data files corresponding to the pictures are received by computer 200, they are automatically sent to the selected addresses, as explained in more detail below. In other implementations, the user may attach other types of tags other than those listed above, e.g., a stitching tag that instructs computer 200 to stitch two or more pictures together.

Referring back to step 310, a method 500 (FIG. 5) depicts a method of processing image data file 330 in computer 200. At step 502, computer 200 receives the image data file via I/O interface 202. In one implementation, I/O interface 202 of computer 200 is coupled to I/O interface 162 of camera 50 to enable the computer to receive the image data file. In another implementation, flash card 164 is removed from camera 50 and inserted into a flash card reader, which is coupled to I/O interface 202 of the computer, to transmit the image data file to computer 200. The camera and flash card reader may be coupled to the computer via a physical connection or wireless connection.

Using CPU 206, computer 200 checks tag field 186 of the received image data file to determine whether corresponding image data 184 needs to be processed in a particular manner according to tags in tag field 186 (step 504). In one implementation, the received image data file is first stored in memory 208 before the tag field is checked by CPU 206. If CPU 206 determines that the tag field does not contain any tag, then image data 184 is processed according to a default setting, i.e., the image data is decompressed and displayed on display device 210 (step 510). Thereafter, the user may edit, print, send, or perform other functions on the image data 184 using input device 212.

On the other hand, at step 506, if there is one or more tags (e.g., resolution tag 188 and quick-send tag 194) in the image tag field, CPU 206 retrieves one of the tags to be processed (step 508). The tags may be retrieved in any order or in the order it was attached in method 400. In this exemplary implementation, the resolution tag is first retrieved, where the resolution tag instructs the computer to convert the image data from the resolution size of one megapixels to the resolution size of three megapixels. The computer processes the image data by performing an appropriate algorithm to increase the resolution size (step 510). In one implementation, a resulting image data file 180' with new image data 184' of three megapixels is saved in memory 208 of the computer. Thereafter, the image with the increased resolution size is displayed on display device 210 to the user for viewing, editing, or performing other functions on the image data.

Figure 6:
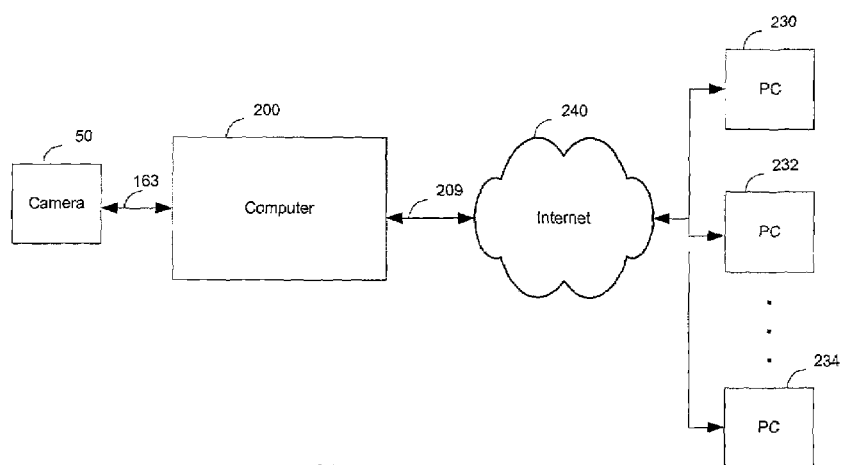
FIG. 6 depicts a block diagram of a computer connected to a communication network according to one embodiment of the invention.

At step 512, the computer checks the tag field to determine if there is any other tags in the tag field. Since another tag exists in tag field 186 in this exemplary implementation, steps 508 to 510 are repeated. The remaining tag, quick-send tag 194, is retrieved (step 508). In one implementation, these subsequent steps may be performed prior to displaying the new image data 184' on the display device. The tag instructs the computer to transmit the image data file to one or more recipients, e.g., Jay Feldis and Bryed Billerbeck. The tag may include the email addresses of these recipients. The computer connects to a communication network via link 209. As shown in FIG. 6, computer 200 is coupled to a plurality of remote computers 230 to 234 via a communication network 240, e.g., the Internet.

The computer initiates and once connected to the Internet, the image data file is sent to the email addresses of Jay Feldis and Bryed Billerbeck. Jay and Bryed having access to remote computers 230 and 232, respectively, may retrieve the image data file transmitted by computer 200. In one implementation, the transmitted image data file is the original image data file 180 transmitted by camera 50, where the image data is formatted to have a resolution size of one megapixels. Therefore, upon receipt of image data file 180, the remote computers may automatically increase the resolution size of image data 184 to three megapixels according to the instructions provided in resolution tag 188 before displaying the image on their respective display devices. Alternatively, the transmitted image data file may be the new image data file 180' with the new image data 184' of three megapixels, thereby eliminating the need to process the resolution tag before displaying the image. One advantage of transmitting the original image data file 184 is bandwidth conservation during transmission of the data file.

As will be understood by those skilled in the art, the present invention may be embodied in other specific forms without departing from the essential characteristics thereof. For example, in other implementations, the original image data may be reduced to a smaller resolution size before transmitting it to the recipients. Accordingly, the foregoing description is intended to be illustrative, but not limiting, of the scope of the invention which is set forth in the following claims.

What is claimed is:

1. A method of processing image data, comprising:
    providing an image capturing apparatus;
    providing a host device for receiving image data generated by the image capturing apparatus, the host device coupled to a communication network;
    targeting an image to be captured with the image capturing apparatus;
    generating first image data representing the targeted image using the apparatus, the first image data having a first resolution size;
    attaching a resolution tag to the first image data for post processing in a device other than the image capturing apparatus, the resolution tag instructing the device to convert the first image data from the first resolution size to a second resolution size;
    attaching a quick-send tag to the first image data for post processing, the quick-send tag designating a recipient and instructing the host device to transmit the first image data to the recipient;
    transmitting a first image data file including the first image data and the resolution tag and quick-send tag to the host device; and
    transmitting a second image data file from the host device to the recipient according to the quick-send tag via the communication network, the second image data file including the resolution tag and a second image data corresponding to the first image data, the second image data having the first resolution size.

2. The method of claim 1, wherein the recipient is a remote host device, further comprising:
    converting the second image data from the first resolution size to the second resolution size according to the resolution tag at the remote host device automatically once the second image data file has been received at the remote host device.

3. The method of claim 2, wherein the first image data and the second image data are substantially the same.

4. The method of claim 2, wherein the first image data and the second image data are different.

5. The method of claim 2, wherein the host device is a computer or an electronic device having wireless connection to the communication network.

6. The method of claim 5, where in the remote host device is a computer or an electronic device having wireless connection to the communication network.

7. The method of claim 6, wherein the communication network is the Internet.

8. The method of claim 5, wherein the image capturing device is a digital camera.

* * * * *